Dec. 22, 1959

E. G. BOICE 2,917,822

METHOD OF MAKING A PIPE JOINT

Filed June 24, 1955

INVENTOR
ELVIN G. BOICE

BY J. Vincent Martin,
Joe E. Edwards.
B. R. Pravel
ATTORNEYS

Dec. 22, 1959

E. G. BOICE 2,917,822

METHOD OF MAKING A PIPE JOINT

Filed June 24, 1955

INVENTOR
ELVIN G. BOICE
BY J. Vincent Martin,
Joe E. Edwards,
B. R. Pravel
ATTORNEYS United States Patent Office 2,917,822
Patented Dec. 22, 1959

2,917,822

METHOD OF MAKING A PIPE JOINT

Elvin G. Boice, Houston, Tex., assignor to Reed Roller Bit Company, Houston, Tex., a corporation of Texas Application June 24, 1955, Serial No. 517,687

8 Claims. (Cl. 29—447)

This invention relates to joints and to methods of making the same.

The conventional drill stem comprises a number of sections of drill pipe connected together by tool joints. The conventional tool joint includes two members, one known as a box member and the other as a pin member. The box member is secured to one end of each drill pipe section and the pin member to the other end. The pin and box members are provided with threads whereby the members may be readily connected and disconnected from each other to assemble and disassemble the drill stem.

The present invention has for one of its general objects the provision of a new and improved tool joint and a method of securing the pin and box members thereof to the ends of the drill pipe.

A specific object of the invention is to reduce the cost of drill stems by providing a new and improved tool joint and method of securing the same to "plain end" drill pipe—that is, pipe having ends not specially threaded, upset, or otherwise prepared for connection to a tool joint.

Another specific object of the invention is to provide a new and improved tool joint and method of applying the same to a drill pipe which will provide a strong and durable connection between the two, capable of withstanding the great strains to which they are subjected in deep well drilling.

Another important object of the invention is to provide a coupling assembly for coupling plain end pipe sections, which coupling is capable of taking tension and compression loads, resisting fatigue failure, and transmitting torque, as well as effecting a fluid-tight seal at the coupled joint.

Still another object is to provide an improved coupling of the character described, including an inner sleeve member which engages within the bore of the coupled pipe sections and an external collar element surrounding the end portion of each pipe section, together with means for securing the sleeve, pipe sections and collar together as a unitary structure.

A further object of the invention is to provide a coupling wherein the plain ends of the pipe sections are flared outwardly and wherein an inner sleeve having complementary tapered portions is insertable within the pipe ends to span the join therebetween; said coupling also including external collar members surrounding the flared pipe ends and having tapered portions within their respective bores for closely engaging the external surface of the pipe sections to secure the pipe sections to the sleeve, said coupling also including welding material for securing the sleeve, pipe sections and collars to each other.

Another and very important object of the invention consists in workhardening the outer surface of the flared end of the pipe and the adjacent portion of said pipe.

Other objects of the invention will hereinafter appear to those skilled in the art.

The preferred embodiment of the invention is illustrated in the accompanying drawings in which Figure 1 is a partly sectional elevation of the new and improved tool joint connecting two sections of drill pipe together.

Figure 1:
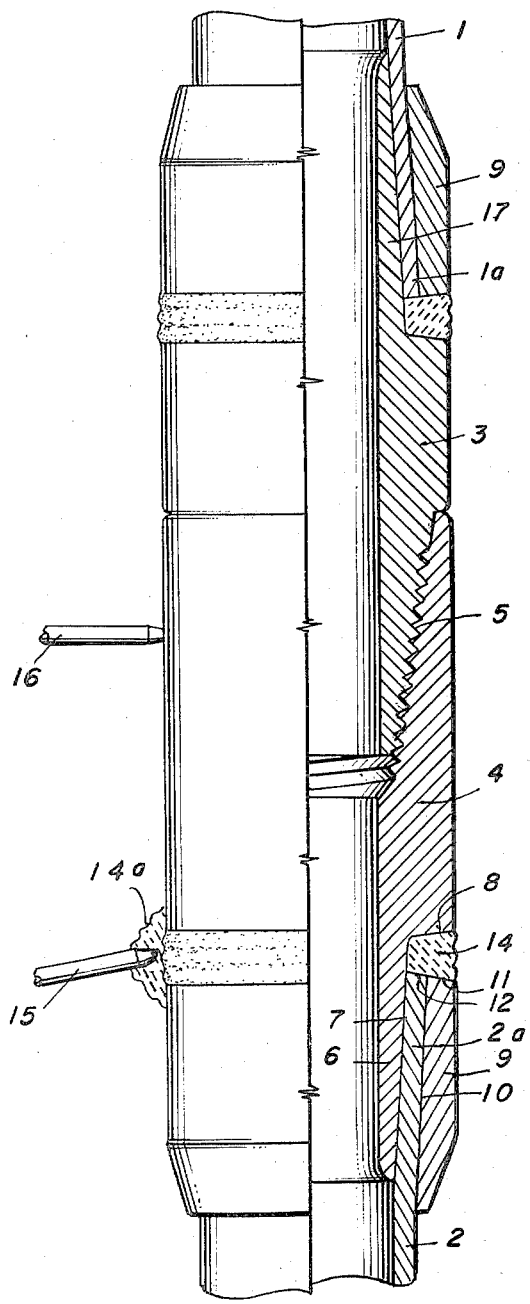

In the drawings, one section of drill pipe is indicated by the numeral 1 and the other section by the numeral 2. The pin member is indicated by the numeral 3, and the box member by the numeral 4, said members being connected together by conventional threads 5.

Referring to the box member 4, it will be noted that this member has a reduced end 6 the outer surface of which is tapered toward the drill pipe 2. The numeral 8 indicates the shoulder formed by the reduction of the end 6 of this member. The shoulder 8 may be tapered inwardly as shown. The numeral 9 indicates a collar having a tapered inner surface 10. The end 11 of the collar 9 and the end 12 of the pipe 2 may be tapered inwardly to provide with the shoulder 8 an inwardly tapering trough for the reception of the welding material 14.

The numeral 15 indicates an electrode submerged in the flux 14a and the numeral 16 the other electrode connected to the joint, to illustrate the use of well known submerged arc welding, in the assembly of the parts provided by this invention.

Referring now in greater detail to one embodiment of the new and improved tool joint and to the method of applying the same to the drill pipe:

The end 2a of the plain end pipe 2 is flared substantially as shown in the drawings. The end 2a may be so flared that it will snugly fit the tapered surface 7 of the reduced end 6 of the joint member 4 when in the position shown by the drawings, in which event the reduced end 6 of the member 4 may be inserted in the flared end 2a of the pipe 2 by hand. The flared end 2a of the pipe 2 may be so flared that its normal internal diameter will be somewhat smaller, in which event the reduced end 6 may be forced by machine into the end 2a to the position shown by the drawings to provide a very tight initial engagement thereof. The end 2a of the pipe may be heated and while it is hot the end 6 of the joint 4 may be inserted in the end 2a, in which event the pipe end 2a will provide an initial shrink grip on the end 6 of the joint.

The collar 9 is placed on the pipe 2 before the end 2a of the pipe is flared, and after the end 6 of the joint has been inserted in the flared end 2a of the pipe, the collar 9 may be moved along the body of the pipe 2 upon the flared end 2a of the pipe substantially to the position shown in the drawings. Since, when the end 2a of the pipe is flared it will occupy an area greater than the area it originally occupied when it constituted the cylindrical end of the pipe, the width or thickness of the end 2a will decrease from the body of the pipe 2 to the extremity of the end 2a. To enable the collar 9 to snugly engage the end 2a, the internal surface 10 of the collar 9 may, for this reason, be tapered at an angle slightly different from the angle of the taper of the surface 7 of the joint end 6. For example, the taper of the surface 7 of the end 6 of the joint may be 3 degrees 30 minutes and the taper of the internal surface 10 of the collar 9 may be 3 degrees. The collar 9 may be so constructed that it will initially snugly fit the end 2a of the pipe so that it can be moved into substantially the position shown by hand; it may be made to fit so tightly that it must be forced by machine into substantially the position shown by the drawings; and it may be heated and then moved substantially into the position shown by the drawings to provide a shrink grip on the end 2a of the pipe when it cools.

The welding material 14 may be applied in the circumferential trough defined by the walls 8 and 11, in any conventional manner. Submerged arc welding may readily be employed by placing the flux in and about the trough defined by the walls 8 and 11 as indicated at 14a, whereupon the electrode 16 having been electrically connected to the joint, the electrode 15 may be submerged in the flux and moved in a circle around the joint, or the electrode 15 may be held stationary and the joint rotated to effect the welding of the parts together. The construction and method are such that conventional submerged arc welding may be readily employed to effect the desired welding.

In the event a very tight initial fit of the end 6 of the member 4 in the end 2a of the pipe 2, and of the collar 9 on the pipe end 2a is desired, any suitable means may be employed to exert a pressure on the parts to force them into substantially the positions shown by the drawings. For example, a jig may be employed to exert a pressure of say 10,000 pounds, and the welding operation may be carried on while this force is being applied. The extremities 11 and 12 of the collar 9 and pipe end 2a may be machined after the parts have been forced together, to provide a smooth side wall for the welding groove a predetermined distance from the shoulder 8. Thus, machining the extremities 11 and 12 of the collar and pipe will permit a less accurate manufacture of the end of the member, the pipe end and the collar because if the extremities 11 and 12 are machined it is not necessary that when the parts are forced together they assume exactly the desired positions for the welding operation.

When the weld 14 cools, the resulting contraction causes an additional movement of the collar 9 and the pipe end 2a toward the shoulder 8 to provide a tighter engagement of the parts and a wider distribution of stresses.

It will be apparent from the foregoing that the joint end 6, the pipe end 2a and the collar 9 are all welded together by the weld 14, thus providing a very strong construction, and the method of making it is relatively simple and inexpensive.

It will also be noted that the external diameter of the collar 9, and of the body of the joint 4 are substantially the same which is an important advantage for reasons which will be apparent to those skilled in the art of which may be mentioned the fact that no obstruction is offered to the downward and upward movement of the drill stem in the well.

The collar 9 forms the tool joint shoulder and may be constructed with tapered elevator shoulders or square shoulders, and with or without hard-metal bands. By selecting different types of collars, many various combinations can be supplied for a string of drill pipe without changing the assembly procedure above described.

It will be understood that the end 1a of the pipe section 1 is flared and connected to the pin member 3 the same as is the end 2a of the pipe section 2 to the box member 4. The reduced end 17 of the pin member 3 is the same as the reduced end 6 of the box member 4.

A very important improvement over the disclosure above outlined consists in workhardening the outer surfaces of the flared ends of the pipes 1 and 2 and the adjacent portions of said pipes, in the manner about to be described. This improvement offers an alternative to the construction above disclosed and to the method of constructing the joint wherein there is very little if any possibility of there being a concentration of stresses in the pipes 1 and 2 immediately adjacent the outer ends of the collar 9, and thus avoiding failures at those points.

The recommended practice consists in making the collar 9 snugly fit the portion 2a of the pipe, so that there is no space therebetween. It is to be understood that this practice likewise applies to the end 1a of the pipe section 1 and the pin member 3. At the same time the outer surface of the portion 2a of the pipe 2 and the adjacent portion of the pipe 2 are workhardened, thereby eliminating within reason any failures at these points.

The assembly procedure recommended for a commercially successful joint follows substantially the herein described pattern but other methods of workhardening could be employed with equal success. The procedure is substantially as follows:

The plain end pipe 2 is sand-blasted inside and outside for a distance of approximately twelve inches from the end to remove mill scale and paint. The collar 9 is then slipped on the pipe and the pipe end is heated to approximately 1500° F., for the flaring operation, during which flaring operation a heating burner is played on the exterior of the pipe so that the pipe will not become unduly cooled when the flaring tool is applied thereto. After the flaring operation, the pipe is allowed to cool slowly. The pipe is then again sand-blasted, as before, to remove any scale that might have formed during the flaring operation. The pipe end surface is then shot peened with No. PO60 shot (.060–.070 O.D. shot), using a ¼ inch nozzle and 100 pounds per square inch air supply, maintaining the nozzle outlet about 2 inches from the surface being peened. During the peening operation, the pipe is rotated at approximately 20 r.p.m. and is moved axially approximately 6 inches per minute. The peening of the pipe occurs on the outer surface thereof as well as in the bore thereof for a distance approximately 12 inches back from the end thereof, resulting in a finish equivalent to what is termed No. 1 Bright.

To assemble the joint, the flared pipe is heated to approximately 600° F. throughout a length of 4 inches from the end, and the joint member 6 is stabbed into the pipe end. The pipe is then allowed to cool and shrink onto the joint member 6. The collar 9 is then heated to approximately 900° F. and slipped into position on the flared end 2a of the pipe 2 and allowed to cool and shrink thereon. The joint is then pre-heated to approximately 600° F. and welded in the manner heretofore disclosed. Experience has shown that it may not even be necessary to work-harden the interior or bore of the pipe in order to achieve a commercially successful joint, known in the industry as a flareweld type joint.

Figure 2:
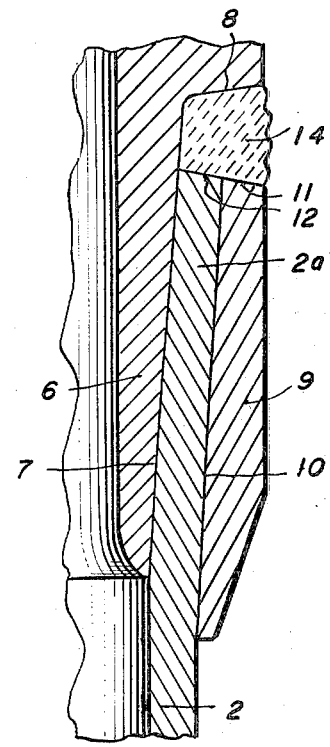
Figure 2 is an enlarged detail view illustrating the union of the body of the tool joint, the pipe and the collar.

The above description is specific to the method that has been employed successfully, but other methods of work-hardening might be employed with equal success. It has been employed successfully in making the joint of Figures 1 and 2, and likewise in making the joint or coupling of Figures 3 and 4, which joint or coupling will now be described. Perhaps it might be well to refer to Figures 3 and 4 as relating to a coupling, as distinguished from the tool joints above described.

Figure 3:
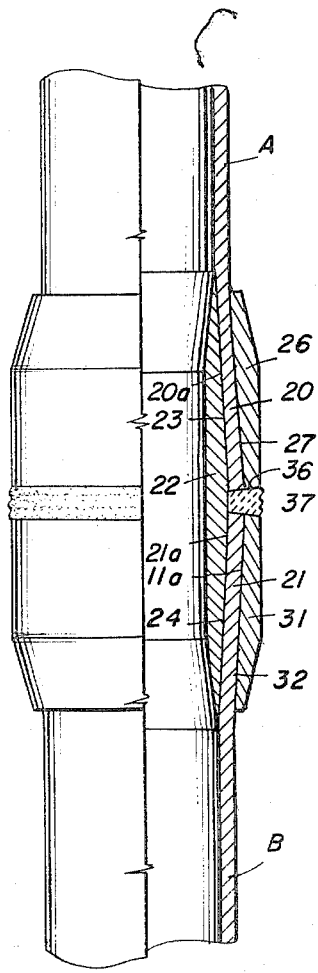
Figure 3 is a view partly in section and partly in elevation of a coupling constructed in accordance with the invention.
Figure 4:
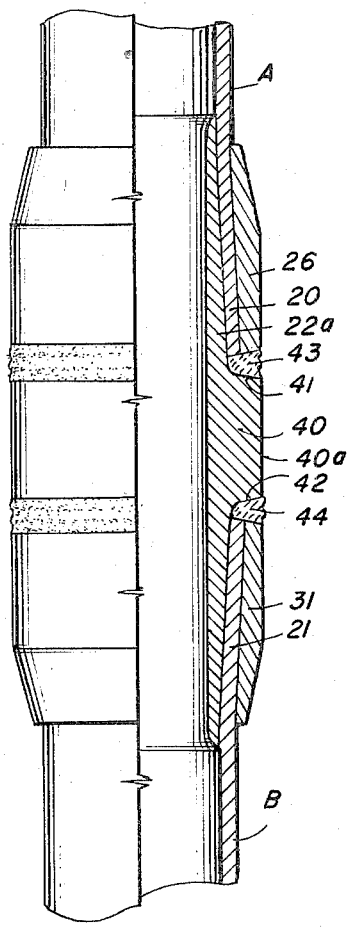
Figure 4 is a similar view illustrating a modified form of said invention.

In Figures 3 and 4, the letter A designates a pipe section having a flared end 20. A second pipe section B having a similar flared end 21 is adapted to be coupled to the section A. A tubular sleeve element 22 is adapted to span the joint between the pipe sections A and B and said sleeve is formed with a tapered surface 23 which engages the bore 20a of the flared portion 20 of pipe section A. A similar taper 24 is provided on the exterior of the sleeve 22 for engagement with the surface 21a of the flared portion 21 of the pipe section B. The tapers 23 and 24 of the sleeve are such that the flared ends 20 and 21 of the pipe sections have a snug fit thereon.

A collar 26 having a taper 27 is engageable over the flared end portion 20 of the pipe section A and has a snug fit thereon. As set forth above, the collar 26 may be slipped on the pipe, prior to the flaring operation, if so desired.

A similar collar 31 is provided with a taper 32 having a tight engagement with the external surface of the flared portion 21 of the pipe B.

When the sleeve 22 and collars 26 and 31 are in position on the flared ends 20 and 21 of the pipe sections, the ends of the pipe sections are spaced from each other and the adjacent ends of the collars 26 and 31 are also spaced from each other. These ends may be machined to form a generally V-shaped groove 36 for the reception of welding material 37. The weld extends annularly about the coupling and functions to secure the collars 26 and 31 to each other, to the pipe sections A and B, and to the inner sleeve 22. Thus, the inner and outer elements of the coupling are secured together with the flared ends of the pipe sections A and B firmly fastened therebetween. The coupling is relatively simple in construction but is capable of withstanding the great strains encountered in deep well drilling. The flaring or swedging out of the ends of the pipe section increases the tension and torsion value of the pipe in the coupling area.

The pipe sections A and B may have the outer surfaces of their flared ends 20 and 21 peened by any suitable method, one of them being set forth above, in order to increase the fatigue life of the pipe.

In Figure 4, a modified form of the invention is illustrated wherein an inner sleeve 22a is substituted for the sleeve 22 of Figure 3. The sleeve 22a is formed with an annular projection 40 which has a thickness which will locate the outer surface 40a of said projection in flush relationship to the exterior surfaces of the collars 26 and 31. The upper surface 41 of the projection 40 is inclined or beveled as is the lower surface 42 thereof.

In this form of the invention the sleeve 22a is engaged by the flared end portions 20 and 21 of the pipes A and B with the pipe ends terminating short of the projection 40. The collars 26 and 31 are then positioned exteriorly on the flared portions 20 and 21 in the manner heretofore described with said collars having their ends terminating in alignment with the pipe sections A and B. The upper collar 26 and pipe will coact with upper inclined surface 41 of the projection 40 to form a weld receiving groove within which welding material 43 is inserted. The lower collar 31 and end of the pipe B coact with the lower inclined surface of said projection to form a second weld receiving groove which receives welding material 44. It is evident that the welding material 43 and 44 functions to secure the collars, pipe ends and inner sleeve together as a unitary structure.

The coupling illustrated in Figure 4 has all of the advantages of the first form of the invention with the exception that two annular welds, instead of one, are provided. In both cases the coupling provides a simple and inexpensive method of coupling plain end pipes to each other in a manner which will permit the pipe to withstand the heavy loads and strains which are encountered in drilling. It is evident that the coupling is particularly adapted for use in salvaging short lengths of drill pipe because by means of said coupling the shorter lengths may be connected together to provide a pipe section of the standard or desired length.

The foregoing disclosures and descriptions of the inventions are illustrative and explanatory thereof and various changes in the size, shape and materials, as well as in the details of the illustrated construction may be made, within the scope of the claims, without departing from the spirit of the invention.

This application forms a continuation-in-part of application Serial No. 190,275, Elvin G. Boice, filed October 16, 1950, for a Joint and Method of Making the Same, now Patent Number 2,711,912, June 28, 1955.

Having described the invention, I claim:

1. The method of securing a joint member to a drill pipe which consists in tapering the internal surface of a collar, placing said collar on the pipe, flaring the end of the pipe, reducing and tapering the end of the joint member, heating the end of the pipe, forcing the tapered end of the joint member in the heated end of the pipe until the extremity of the pipe is adjacent the shoulder formed by the reduction of the end of the joint member, heating the collar, forcing the heated collar on the end of the pipe until it is adjacent said shoulder to form a circumferential trough, and welding the joint member, the pipe end and the collar together at said shoulder.

2. The method of securing a joint member to a drill pipe which consists in tapering the internal surface of a collar, placing said collar on the pipe, flaring the end of the pipe, reducing and tapering the end of the joint member, heating the end of the pipe, inserting the tapered end of the joint member in the heated end of the pipe until the extremity of the pipe is adjacent the shoulder formed by the reduction of the end of the joint member, heating the collar, moving the heated collar on the end of the pipe into a position adjacent said shoulder to form a circumferential trough, and welding the joint member, the pipe end and the collar together at said shoulder.

3. The method according to claim 1 in which said joint member is a drill stem tool joint.

4. The method according to claim 1 in which said joint member is a coupling.

5. The method of securing a joint member to a drill pipe which consists in tapering the internal surface of a collar, placing said collar on the pipe with the greater internal diameter of said collar closely adjacent to the end of the pipe, heating the pipe end to approximately 1500° F. prior to a flaring step during which flaring step the exterior of said pipe is additionally heated to prevent cooling of said pipe during the flaring step, flaring the end of said pipe and then allowing the pipe end to cool slowly, reducing and tapering the end of the joint member, heating the flared end of the pipe to approximately 600° F., forcing the tapered end of the joint member in the heated end of the pipe until the extremity of the pipe is adjacent the shoulder formed by the reduction of the end of the joint member, permitting the pipe end to cool and shrink onto said joint member, heating said collar to approximately 900° F., forcing said heated collar on the end of the pipe until its is adjacent said shoulder to form a circumferential trough, permitting said collar to cool and shrink onto said pipe, again preheating to approximately 600° F. said joint member, the pipe end and the collar, and welding the joint member, the pipe end and the collar together at said shoulder.

6. The method according to claim 5 including the step of sand-blasting the end of the pipe for a distance of approximately twelve inches both interiorly and exteriorly thereof prior to the placing of said collar, and the step of work-hardening by shot peening the interior and exterior surfaces of said pipe end for a distance of approximately twelve inches following the cooling step after said flaring step.

7. The method of securing a joint member to a drill pipe which consists in tapering the internal surface of a collar, placing said collar on the pipe with the greater internal diameter of said collar closely adjacent to the end of the pipe, flaring the end of the pipe, reducing and tapering the end of the joint member, work-hardening the interior and exterior surface of the pipe end, heating the end of the pipe, inserting the tapered end of the joint member in the heated end of the pipe until the extremity of the pipe is adjacent the shoulder formed by the reduction of the end of the joint member, heating the collar, moving the heated collar on the end of the pipe into a position adjacent said shoulder to form a circumferential trough, and welding the joint member, the pipe end and the collar together at said shoulder.

8. The method according to claim 7 including the step of sand-blasting the end of the pipe for a distance of approximately twelve inches both interiorly and exteriorly thereof prior to the placing of said collar, and the step of work-hardening the interior and exterior surfaces of said pipe end for a distance of approximately twelve inches following a cooling step after said flaring step.

References Cited in the file of this patent

UNITED STATES PATENTS

| | | |
|---|---|---|
| 1,820,069 | Herr | Aug. 25, 1931 |
| 1,934,022 | Wiggins | Nov. 7, 1933 |
| 1,935,425 | Wiggins | Nov. 14, 1933 |
| 2,233,455 | Larson | Mar. 4, 1941 |
| 2,267,339 | Paulsen | Dec. 23, 1941 |
| 2,273,736 | Raymond | Feb 17, 1942 |
| 2,301,495 | Abegg | Nov. 10, 1942 |
| 2,378,525 | Abegg | June 19, 1945 |
| 2,585,237 | Gay | Feb. 12, 1952 |
| 2,711,912 | Boice | June 28, 1955 |